United States Patent [19]

Halley et al.

[11] Patent Number: 4,969,094

[45] Date of Patent: * Nov. 6, 1990

[54] SELF-IMPLEMENTING PENSION BENEFITS SYSTEM

[75] Inventors: Gustavo M. Halley; Julio M. Yanes, both of Miami, Fla.

[73] Assignee: Pension Benefits System Trust, Miami, Fla.

[*] Notice: The portion of the term of this patent subsequent to Jun. 7, 2005 has been disclaimed.

[21] Appl. No.: 354,923

[22] Filed: May 22, 1989

[51] Int. Cl.$^5$ .............................................. G06F 15/30
[52] U.S. Cl. ...................................... 364/408; 364/401
[58] Field of Search ................................ 364/400–401, 364/408

[56] References Cited

U.S. PATENT DOCUMENTS 4,750,121  6/1988  Halley et al. ...................... 364/408

OTHER PUBLICATIONS

J. Andresky, "Take Your Money and Run", Forbes, Apr. 23, 1984, vol. 123, p. 152.

Lebenson, "Split Funded Pension Plan: a Good Buy for the Small Businessman", Liffe Ass. News, Sep. 1984, pp. 172–177.

"Employee Handbook", of the U.S. Dept. of Commerce, Nov. 1984, pp. 17-1 to 17-4.

Primary Examiner—Michael R. Fleming
Assistant Examiner—Gail O. Hayes
Attorney, Agent, or Firm—Charles J. Prescott

[57] ABSTRACT

A self-implementing pension benefits system for subscriber employees (E1, E2, E3 . . . ) including a life insurer institution and a lending institution Life insurer trust institution computes and receives each subscriber employee's periodic payment thereinto based primarily upon each subscriber employee's age and desired periodic benefits and issuing a life insurance policy covering each subscriber employee (E1, E2, E3 . . . ); providing specific accurate future projections of periodic benefits for retirement, death, or disability; and distributing all life insurance policy proceeds upon the death of each enrolled employee to the lending institution. Funding a significant portion of payable periodic benefits by reverse annuity issued by the lending institution, secured by life insurance policy proceeds retained within the lending institution is one truly unique feature of this system; life insurance having prescribed amounts of whole life and progressive one-year term dividend rider components is yet another.

17 Claims, 1 Drawing Sheet

SELF-IMPLEMENTING PENSION BENEFITS SYSTEM

BACKGROUND OF THE INVENTION

This invention relates generally to pension plans, and more specifically, to a self-implementing pension benefits system utilizing life insurance as a major vehicle for funding benefits.

Several Congressional acts since 1974 including ERISA and TEFRA have led the way in a Congressional attempt to stem the tide of underfunded or illusory pension benefits in the past. To a large extent, these Congressional efforts coupled with other judicial pronouncements have contributed to the demise rather than strengthening of many of these prior pension programs and have compelled drastic changes in those that remain. Several economic and social factors including inflation, longer life expectancies, higher interest rates, recession, bankruptcies and other economic factors have all taken heavy tolls on private pension plans.

More recently, many private pension plans which had moved to adopt defined benefits pension plans are now being forced to either amend or dissolve their programs, resulting in loss by employees of considerable unvested benefits and creating a new movement toward defined contributions programs which are completely open ended concerning levels of benefits and protection of future purchasing power.

The present system, while fully complying with all of the latest Congressional and judicial mandates, provides a novel fully funded pension benefits system which imposes considerably lower and fixed determinable financial burdens upon each subscriber employee who may be an individual below retirement age, whether employed or not, and relieves him of all administrative and fiduciary responsibility, while also providing expanded, accurately predictable, and increasing benefits to all such enrolled employees. Benefits are expanded in that, in addition to periodic retirement payments after retirement age e.g., 65, both death and disability benefits are also provided. Rather than being fixed or completely undeterminable, all benefits provided by the present system are projectable from the onset of a program so that each subscriber employee may determine his or her future benefits resulting from death, disability, or retirement and be assured that because of a built-in increasing benefits, that the benefits he or she receives will keep pace with inflation, retaining his purchasing power. The marvels of this new self-implementing pension system are, in large part, achieved by a unique implementation of life insurance to fund future payable liabilities by a lending institution utilizing principles of reverse annuity also in a unique way. Rather than terminating life insurance at employee retirement, each policy is maintained in force by the life insurer until the employee's death, the proceeds flowing to the lending institution chosen to assist in funding the reverse annuity and the associated periodic benefits.

BRIEF SUMMARY OF THE INVENTION

The present invention is that of a self-implementing pension benefits system for subscriber employees including a lending institution and a life insurer institution. The functions of the life insurer institution include: computing and receiving each subscriber employee's periodic payment thereinto based primarily upon each employee's desired projected periodic benefits and their ages; issuing a unique life insurance policy covering each subscriber employee; providing specific accurate future projections of periodic benefits for retirement, death, or disability; and distributing all life insurance policy proceeds upon the death of each enrolled employee to the lending institution and/or second beneficiaries of each employee. Funding a significant portion of payable periodic benefits by reverse annuity issued by the lending institution, secured by the cash value of life insurance policy proceeds retained within the lending institution is one truly unique feature of this system; life insurance having prescribed amounts of whole life and increasing one-year term dividend rider components is yet another.

It is therefore an object of the present invention to provide a self-implementing pension system for subscriber employees without the need for employer participation and which will both reduce and accurately define employee contributions while eliminating the need for all employee contributions after a predetermined number of years.

It is another object of this invention to provide a unique self-implementing pension system which provides periodic benefits upon death, disability or retirement of each enrolled employee.

It is still another object of this invention to provide the above pension benefits system whose benefits are automatically increased at predetermined fixed rates to help keep pace with inflation.

Still another object is to provide the above invention fully funded in part by a unique utilization of life insurance which will serve as collateral for a reverse annuity.

In accordance with these and other objects which will become apparent hereinafter, the instant invention will now be described with reference to the accompanying drawings in which:

DETAILED DESCRIPTION OF THE INVENTION

Figure 1:
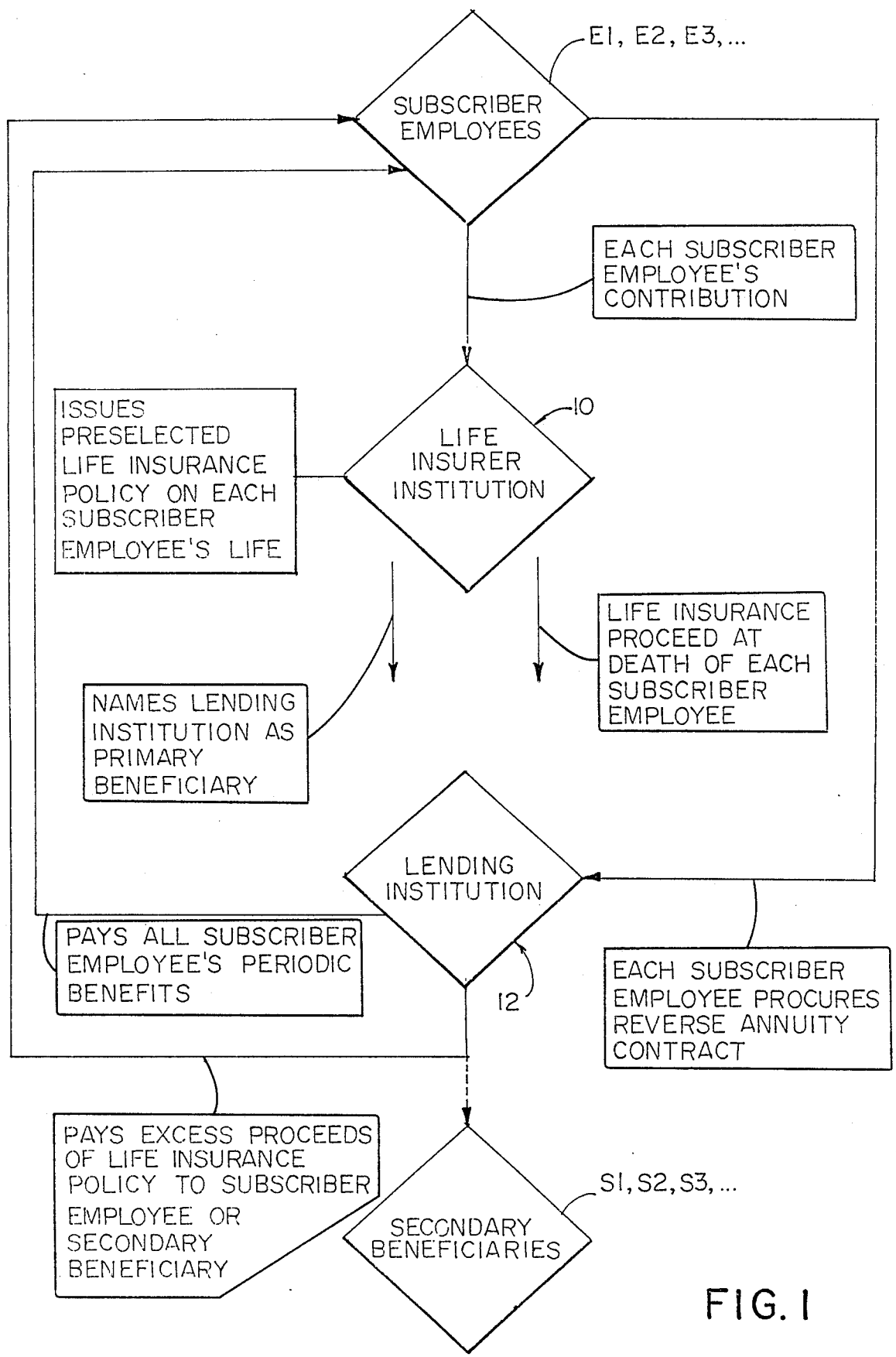
FIG. 1 is a schematic flow diagram of the entire pension benefits system.

Referring now to FIG. 1, the system of the present invention includes a life insurer institution 10 and a lending institution 12, which relate and exist functionally as follows. Each subscriber employee E1, E2, E3 . . . , makes a predetermined periodic contribution into the life insurer institution 10. The life insurer institution 10 then, continuously and regularly performs several functions. A portion of each subscriber employer's contribution is applied for purchasing a predetermined life insurance policy against each enrolled employee's life from the life insurance institution 10. A significant portion of the funding of all payable periodic benefits to subscriber employees, E1, E2, E3, . . . is achieved through the unique utilization of predetermined amounts of life insurance. The lending institution 12 receives and retains the life insurance policies and subsequently receives all life insurance proceeds associated therewith at the death of each employee E1, E2, E3, . . . who elects to receive reverse annuity payments.

It is here noted that, although participants of this system are referred to generally herein as "subscriber employees", any individual below retirement age who wishes to enroll may do so, even if unemployed, so long as prescribed payments to the life insurer are timely made for the predetermined number of months, e.g. 180 months.

The fact that life insurance is used universally in this system to fund both pre-retirement, post-retirement, and disability benefits produces a significant cost savings for this system. Whereas typically life insurance held by individuals or is otherwise terminated and converted to cash equal to the cash value of the policy to serve as collateral for an annuity at retirement, the lending institution 12 retains the life insurance policy on each employee in full force and effect until death.

Coupled with a whole life insurance policy on each subscriber employee's life, the life insurer institution 10 also automatically issues a one-year term dividend increasing term rider in conjunction with each whole life policy providing for increasing proceeds without the expense of first year agent commissions and additional policy fees and handling expenses by the life insurer institution 10.

To further enhance the accumulation of cash within the life insurer under this system, all accumulated dividends in excess of that necessary to fund the one year term rider and all monthly payments after the predetermined number of months, e.g. 180 months, are utilized to purchase paid-up whole life insurance additions to the basic whole life policy for each subscriber employee. These additional dividends are accumulated from interest on dividends themselves which are utilized in part, to purchase these paid-up insurance additions. These paid-up additions also share in dividends and will have increasing cash and loan values at a point in time when the subscriber employee chooses to utilize the policy to serve as collateral for the lending institution in exchange for establishing the reverse annuity and periodic payments associated therewith. Thus, two separate accounts within the life insurer earn dividends compounded annually.

An additional feature preferred is the incorporation of disability waiver of premium during the initial period of the program when each subscriber employee is paying policy premiums. Should the subscriber employee become disabled during this initial payment period, the life insurer has waived further payment of any premiums so that the overall program remains in full force and effect even if the subscriber employee has lost his ability to continue to pay the premiums for the expected time period.

While typically the rest of the pension world dictates that when an employee retires, his life insurance policy should be surrendered in favor of a cash surrender value to help pay retirement benefits or to dund an annuity, the present system retains the whole life policy in force until death. The one year progressive term dividend rider portion of the life insurance is terminated at retirement age, e.g. 65, because the risk of payment of disability and pre-retirement death benefits are no longer present. The benefits derived by retaining the whole life insurance policy in force until employee's death amounts to approximately 20 to 25 percent increased revenues to guarantee reverse annuity payments from the lending institution 12 as compared with the cash surrender value of that whole life insurance policy a retirement age.

Once the level of employee benefits have been chosen by each subscriber employee, the level of life insurance policy is then established. In the preferred embodiment, the amount of whole life insurance is typically equal to about 100 times the employee's desired monthly benefits, while the one year term dividend rider is equal to approximately three times the desired monthly benefits increasing yearly automatically to normal retirement age. An important secondary benefit in the choice of the one year progressive term dividend rider is that all cash dividend yields therefrom are accumulated within the life insurer institution 10. By this dividend accumulation, after, e.g. 15 years or other predetermined period of time, the accumulated dividends from the whole life policy are sufficient such that all future life insurance premiums for both the whole life portion and the increasing term dividend portion will be automatically paid from accumulated dividends for each employee's policy after the 15 years of participation in the system. Thereafter, no further subscriber employee contributions are required. However, each subscriber employee may elect to make continued further payments to enhance and compound further cash values.

Benefits of this system include periodic payments upon death, disability, or retirement of each employee. Death benefits vest upon the enrollment by the subscriber employee into the system, and are payable beginning immediately upon the death of a subscriber employee to the employee's beneficiaries. These periodic death benefits are payable for a predetermined period of years. Disability benefits vest also on enrollment of the subscriber employee, and are payable upon the occurrence of the disability in supplemental form to Social Security such that the total amount of periodic benefits received by the disabled employee is at a predetermined level.

Because this program is self-implementing by each subscriber employee, there is no issue of portability or loss of accumulated benefits should a subscriber employee choose to change employers. This system is completely detached from an employer and therefore any job shifting between employers or temporary discontinuance of employment altogether prior to retirement has no effect whatsoever on benefits to be received.

BASIC ASSUMPTIONS

Obviously, one primary assumption in this pension benefits system is the current life expectancy of employees. This is assumed to be equal between men and women and is determined actuarially on a yearly basis. Because no pension benefits are payable before a predetermined number of years of employee participation, the only financial exposure during that period would be from death or disability of the employee. Therefore, during this start-up period, the liabilities are treated and calculated separately and fully funded separately.

After a predetermined number of years of payments by each employee, e.g. fifteen years, life insurance premiums begin to be paid by the whole life policy dividend accumulations. Thereafter, all life insurance premiums for a given subscriber employer are paid substantially, if not totally, by dividend accumulations within the life insurance institution.

Because at the pre-established age of retirement of each employee the risk of having to pay pre-retirement death or disability benefits is extinguished, the term rider portion of the life insurance policy is discontinued for each particular enrolled employee. However, the accumulated dividends from that whole life policy will continue to automatically accumulate and to pay the whole life insurance policy premiums on each employee after his retirement age.

All employee periodic benefits are increased annually throughout the duration of their participation in the program and into retirement in order to compensate for loss of purchasing power due to inflation. However, rather than tieing benefits level to uncontrollable cost of living indexes or the like, this system incorporates predetermined fixed simple interest percentages of yearly benefits increases based upon the employee's start-up salary. Benefits calculations described herebelow and which may be tabularized, provide an easy index for determining minimum future payable benefits, that is, benefits which are upwardly adjusted annually according to the predetermined yearly simple percentage rate of increase.

Death benefits are presumed to be required by the employee's beneficiaries only for a fixed period of years. Thereafter, periodic benefits will terminate. However, disability benefits are payable periodically to the employee from the reverse annuity by the lending institution as a supplement to Social Security until death. These benefits for disability will increase according to the assumed fixed simple interest inflation factor until a preselected age and level thereafter until death. Likewise, retirement benefits continue to increase by the simple interest inflation factor until a preselected age and level thereafter until death or the termination of the annuity contract, whichever occurs first.

Principles of Annuity

One typical use of whole life insurance policies at retirement is to convert or retire them to the life insurer in exchange for a lump sum amount equal to the cash value of the policy at retirement. This cash amount may be utilized by the individual by transfering the cash to a lending institution which will then establish an annuity contract and periodic payments associated therewith for a predetermined number of years.

In the present system, the policy is maintained in full force and effect until death. However, at retirement or other preselected time periods, each subscriber employee may establish a reverse annuity by assigning the first beneficiary interest of the policy to a lending institution. This is done strictly in conjunction with maintaining the life insurance policy in full force and effect. By accepting assignment of first beneficiary interest under the policy, the lending institution is assured of payment of a sum certain which will typically be somewhat less than the total cash value of a whole life policy when the reverse annuity is established.

Projected increases in cash value are due to at least two factors. First, the paid-up additions have substantially increased the cash value of the policy. Additionally, because the policy is to be maintained in full force and effect until the death of the employee, the cash value of the policy continues to accumulate and increase on a yearly basis so that, the longer the subscriber employee lives, the greater the cash value to be transferred to the lending institution at the death of the employee or the termination of the reverse annuity contract, whichever occurs first. However, a very important feature of this system is realized in the form of increased cash value at death which occurs after termination of the reverse annuity contract. Even though the lending institution is paid its principle and interest at the end of the annuity contract by the life insurer, the remaining cash value continues to accumulate. The employee may thus immediately continue to receive anticipated increased monthly payments from the life insurer or a large death benefit payment to second beneficiaries, or both, when reverse annuity payments terminate.

Reverse Annuity Formula

This system also provides for standardized formula for calculating the expected cash value and reverse annuity payments at retirement, or whenever the subscriber employee wishes to commence reverse annuity payments. Accordingly, from the inception, all benefits are predictable by each enrolled employee. This predictability is utilized to assist each subscriber employee in preselecting the amount of benefits desired at retirement disability or death and, accordingly, determines the amount of the whole life policy to be issued and its associated cash values. These benefits are selected based only upon the amount of monthly payments which the subscriber employee can afford, balanced by the projected cash values and reverse annuity benefits associated with those payments.

Following is the general formula used to calculate the reverse annuity values:

$$\frac{(NELI)}{(LCBP)(X \text{ yrs.})} = \text{Initial Monthly Benefit}$$

where:
NELI = Net equity of the life insurance policy at time of reverse annuity contract
LCBP = Lending institution cumulative balance of payments, i.e., the amount that will be due and owing (principle and interest) to it by employee at end of reverse annuity contract, X years.

The above formula is of a general nature which may be utilized to determine any one of the three factors contained therein when two of the other factors are known or assumed. However, the preferred embodiment of the formula is modified in the following manner. Of course, the NELI is determined from conventional life insurance cash value tables in conjunction with the specialized life insurance program as hereinabove described. The initial monthly payment represents either the desired or the projected beginning payments to each subscriber employee. Part of the uniqueness of this system, however, resides in the determination of LCBP. In the preferred system, the reverse annuity period is established at 30 years of payments or 360 monthly payments. Additionally, the LCBP is calculated based upon increasing payments to each subscriber employee at a fixed simple rate over an initial period of the annuity contract, e.g. 10 years. A further assumption needs to be made in the determination of LCBP, that being the assumed interest rate to be charged by the lending institution for establishing the reverse annuity contract. Although some uncertainty resides in establishing this interest rate, nonetheless a range of interest rates may be assumed for calculation purposes so that each subscriber employee may accurately predict the expected range of payments at the time of establishing the reverse annuity contract.

Again, for the purposes of describing the preferred embodiment, an increasing payment rate of five percent is utilized over a ten year or 120 month period. Further, an interest rate of ten percent (10%) is assumed as a reasonable rate to be charged by each lending institution for establishing and on paying each reverse annuity contract.

The following table, then, lists a series of LCBP's which accurately indicate the amount of monies which would have to be repaid to the lending institution after the corresponding number of years of payments on a monthly basis, starting with an initial monthly payment of one dollar ($1.00). In this table, the age of the subscriber employee is indicated wherein the reverse annuity contarct commenced at age 65 for a thirty year period.

Also indicated in the table herebelow is the total principle paid at the end of the corresponding number of years and the accrued intrest owed to the lending institution, the total of which combine to equal the LCBP.

| TABLE OF FACTORS @ 10% INTEREST | | | | | |
|---|---|---|---|---|---|
| Age | Years of Payments | Principle Paid | + Interest Accrued | = | L.C.B.P. |
| 75 | 10 | 147 | 69.1646 | | 216.1646 |
| 80 | 15 | 234 | 164.7796 | | 398.7796 |
| 85 | 20 | 321 | 303.8946 | | 624.8946 |
| 90 | 25 | 408 | 486.5096 | | 894.5096 |
| 95 | 30 | 495 | 712.6246 | | 1207.6246 |

Utilizing the above table of factors in its simplest form and based upon the assumptions contained therein as hereinabove described, i.e., a 10% interest rate on the reverse annuity contract with payments starting at one dollar ($1.00) and increasing 5% simple yearly to the tenth year and continuing constant thereafter to year 30, it may readily be seen that, at the end of ten years, the L.C.B.P. will equal two hundred sixteen dollars and 1646/100 ($215.16 rounded off). Likewise, the total amount due and owing at the end of the thirty year period will be one thousand two hundred seven dollars and 6246/100 ($1,207.62 rounded off).

To utilize the above table of factors in a more comprehensive way, the initial monthly benefits payments desired are inserted into the above formula, the L.C.B.P. at the end of the thirty year period as indicated in the above table, is inserted into the formula allowing the NELI to be determined. The NELI will then be utilized in conjunction with actuarial tables available from the life insurance institution based upon the present age of the participant which will then allow the determination of the actual face amount of the whole life insurance policy to be issued and the corresponding subscriber employee periodic payments associated therewith.

Utilizing the above formula and table, each perspective enrolled employee may quickly determine the expectd benefits payments at death, retirement, or disability at a predetermined point in time. Of course, other tables assuming different increasing levels of payments and assumed reverse annuity contract interest dates may be easily developed.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A computerized self-implementing pension benefits system for administering individual subscriber employee accounts on behalf of subscriber employees who are to receive periodic benefits payments, said system comprising:
a money lender; and
a life insurer;
said life insurer including:
  a. subscriber employee contribution computing means for computing and receiving each said subscriber employee's particular periodic contribution based upon preselected periodic benefits payments;
  b. life insurance policy issue means for issuing a pre-selected life insurance policy for each said subscriber employee's life, each said life insurance policy to be assignable to, retained by, and naming as its beneficiary, said money lender;
  c. periodic death benefit payment means for dispersing payable death benefits upon the death of each said subscriber employee who has assigned said life insurance proceeds to said money lender and has arranged for commencement of periodic reverse annuity payments by said money lender;
life insurance proceeds collecting means within said money lender for receiving and retaining from said life insurer all said life insurance policy proceeds assigned to said money lender as said beneficiary upon each subscriber employee's death;
periodic reverse annuity payment means for dispersing periodic benefits from said money lender to each said subscriber employee who has assigned said life insurance proceeds to said money lender and has arranged for commencement of periodic reverse annuity payments by said money lender.

2. A computerized self-implementing pension benefits system as set forth in claim 1, wherein said pension benefits include:
periodic retirement benefits payments;
periodic death benefits payments; and
periodic disability benefits payments.

3. A computerized self-implementing pension benefits system as set forth in claim 1, wherein each said life insurance policy includes:
a whole life policy and a progressive one year term dividend rider coupled with said whole life policy on each subscriber employee's life.

4. A computerized self-implementing pension benefits system as set forth in claim 3, further comprising:
means for maintaining each said whole life policy by said life insurer in full force and effect until the death of each said subscriber employee, whether working or retired;
means for maintaining each said rider by said life insurer in full force and effect until a predetermined retirement age or earlier death of each said subscriber employee.

5. A computerized self-implementing pension benefits system as set forth in claim 3, further comprising:
means for producing dividends by each said whole life policy which are accumulated and retained by said life insurer;
means for accumulating said dividends after a predetermined number of years of participation by each said subscriber employee to automatically pay for all subsequent life insurance policy premiums.

6. A computerized self-implementing pension benefits system as set forth in claim 3, wherein:
each said rider yearly increases said insurance policy proceeds a predetermined amount until said predetermined retirement age or earlier death of each said enrolled employee.

7. A computerized self-implementing pension benefits system as set forth in claim 3, further comprising:
means for producing by additional dividends each said life insurance policy which are used annually to purchase paid-up additions to each said life insurance policy.

8. A computerized self-implementing pension benefits system for administering individual subscriber employee accounts on behalf of subscriber employees to provide periodic benefits payments for each said subscriber employee beginning at the earliest of death, disability or retirement, said system comprising:
a money lender; and
a life insurer;
said life insurer including:
  a. subscriber employee contribution computing means for computing and receiving each said subscriber employee's particular periodic contribution based upon preselected periodic benefits payments;
  b. life insurance policy issue means for issuing a preselected life insurance policy for each said subscriber employee's life, each said life insurance policy to be assignable to, retained by, and naming as its beneficiary, said money lender, each said life insurance policy including a whole life policy and a progressive one year term dividend rider coupled with said whole life policy for each said subscriber employee's life;
  c. periodic death benefit payment means for dispersing payable death benefits upon the death of each said subscriber employee who has assigned said life insurance proceeds to said money lender and has arranged for commencement of periodic reverse annuity payments by said money lender;
life insurance proceeds collecting means within said money lender for receiving and retaining from said life insurer all said life insurance policy proceeds assigned to said money lender as said beneficiary upon each subscriber employee's death;
periodic reverse annuity payment means for dispersing periodic benefits from said money lender to each said subscriber employee who has assigned said life insurance proceeds to said money lender and has arranged for commencement of periodic reverse annuity payments by said money lender.

9. A computerized self-implementing pension benefits system as set forth in claim 8, further comprising:
means for maintaining each said whole life policy by said life insurer in full force and effect until the death of each said subscriber employee, whether working or retired;
means for maintaining each said rider by said life insurer in full force and effect until a predetermined retirement age or earlier death of each said subscriber employee.

10. A computerized self-implementing pension benefits system as set forth in claim 8, further comprising:
means for producing dividends by each said whole life policy which are accumulated and retained by said life insurer;
means for accumulating said dividends after a predetermined number of years of participation by each said subscriber employee to automatically pay for all subsequent life insurance policy premiums.

11. A computerized self-implementing pension benefits system as set forth in claim 8, wherein:
each said rider yearly increases said insurance policy proceeds a predetermined amount until said predetermined retirement age or earlier death of each said subscriber employee.

12. A computerized self-implementing pension benefits system as set forth in claim 8, further comprising:
means for producing by additional dividends each said life insurance policy which are used annually to purchase paid-up additions to each said life insurance policy.

13. A computerized self-implementing pension benefits system for administering individual subscriber employee accounts on behalf of subscriber employees to provide periodic benefits payments for each said subscriber employee beginning at the earliest of death, disability or retirement, said system comprising:
a money lender; and
a life insurer;
said life insurer including:
  a. subscriber employee contribution computing means for computing and receiving each said subscriber employee's particular periodic contribution based upon preselected periodic benefits payments;
  b. life insurance policy issue means for issuing a pre-selected life insurance policy for each said subscriber employee's life, each said life insurance policy to be assignable to, retained by, and naming as its beneficiary, said money lender, each said life insurance policy including a whole life policy and a progressive one year term dividend rider coupled with said whole life policy for each said subscriber employee's life, each said life insurance policy producing additional dividends which are used annually to purchase paid up additions to said life insurance policy;
  c. periodic death benefit payment means for dispersing payable death benefits upon the death of each said subscriber employee who has assigned said life insurance proceeds to said money lender and has arranged for commencement of periodic reverse annuity payments by said money lender;
life insurance proceeds collecting means within said money lender for receiving and retaining from said life insurer all said life insurance policy proceeds assigned to said money lender as said beneficiary upon each subscriber employee's death;
periodic reverse annuity payment means for dispersing periodic benefits from said money lender to each said subscriber employee who has assigned said life insurance proceeds to said money lender and has arranged for commencement of periodic reverse annuity payments by said money lender.

14. A computerized self-implementing pension benefits system as set forth in claim 13, further comprising:
means for maintaining each said whole life policy by said life insurer in full force and effect until the death of each said subscriber employee, whether working or retired;
means for maintaining each said rider by said life insurer in full force and effect until a predetermined retirement age or earlier death of each said subscriber employee.

15. A computerized self-implementing pension benefits system as set forth in claim 13, further comprising:

means for producing dividends by each said whole life policy which are accumulated and retained by said life insurer;

means for accumulating said dividends after a predetermined number of years of participation by each said subscriber employee to automatically pay for all subsequent life insurance policy premiums.

16. A self-implementing pension benefits system as set forth in claim 13, wherein: each said rider yearly increases said insurance policy proceeds a predetermined amount until said predetermined retirement age or earlier death of each said subscriber employee.

17. A self-implementing pension benefits system as set forth in claim 13, further comprising:

means for producing by additional dividends each said life insurance policy which are used annually to purchase paid-up additions to each said life insurance policy.

* * * * *